(12) United States Patent
Gossaye et al.

(10) Patent No.: US 7,564,593 B2
(45) Date of Patent: Jul. 21, 2009

(54) METHOD AND APPARATUS FOR IDENTIFYING DOCUMENT SIZE

(75) Inventors: Biruk Gossaye, Rochester, NY (US);
Nancy R. Kelly, Rochester, NY (US);
Terri A. Clingerman, Palmyra, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 957 days.

(21) Appl. No.: 10/904,640

(22) Filed: Nov. 19, 2004

(65) Prior Publication Data

US 2006/0109520 A1   May 25, 2006

(51) Int. Cl.
*H04N 1/40* (2006.01)
*H04N 1/04* (2006.01)

(52) U.S. Cl. ..................... 358/449; 358/488
(58) Field of Classification Search .......... 358/400–498
See application file for complete search history.

(56) References Cited

U.S. PATENT DOCUMENTS

| | | | |
|---|---|---|---|
| 5,497,236 A | 3/1996 | Wolff et al. | |
| 5,517,587 A | 5/1996 | Baker et al. | |
| 5,528,387 A | 6/1996 | Kelly et al. | |
| 5,590,224 A | 12/1996 | Fast et al. | |
| 5,594,815 A | 1/1997 | Fast et al. | |
| 5,594,817 A | 1/1997 | Fast et al. | |
| 5,729,635 A | 3/1998 | Fast et al. | |
| 5,805,970 A * | 9/1998 | Kasamatsu | 399/376 |
| 5,912,448 A | 6/1999 | Sevier et al. | |
| 6,064,778 A * | 5/2000 | Pasco et al. | 382/289 |
| 6,574,375 B1 | 6/2003 | Cullen et al. | |
| 2001/0022674 A1 | 9/2001 | Kelly et al. | |
| 2001/0022675 A1 | 9/2001 | Kelly et al. | |
| 2003/0038992 A1 | 2/2003 | Eummeneggep et al. | |
| 2004/0062455 A1 | 4/2004 | Rudak et al. | |

* cited by examiner

*Primary Examiner*—Douglas Q Tran
(74) *Attorney, Agent, or Firm*—Oliff & Berridge, PLC (57) ABSTRACT

A document size identification module receives a single scan of a document and detects for at least one of a black to white transition and a white to black transition. The black to white transition may represent a transition from an overscan area of a platen to a document. The white to black transition may represent a transition from the document to the overscan area of the platen. By detecting at least one of the black to white transition and the white to black transition, the document width may be determined. By determining the document width, the document size may be identified.

16 Claims, 8 Drawing Sheets

METHOD AND APPARATUS FOR IDENTIFYING DOCUMENT SIZE

BACKGROUND

The disclosure is directed to imaging systems, and in particular to imaging systems that identify a document size.

In related art imaging systems, in order to duplicate a document that is placed on a platen, a scanner scans the document to generate an electronic image of the document. The electronic image may be stored in memory, which may be subsequently used to duplicate the document. Usually, the document size needs to be identified so that the copied image can be reproduced on a correctly sized paper sheet. Related art imaging system can accomplish this by either manually selecting the document size or by automatically pre-scanning the document using the scanner.

For example, U.S. Patent Publication No. 2003/0038992 to Stephan W. Emmenegger et al., filed Feb. 8, 1999, discloses an automatic document feeder (ADF) and scanner combination that automatically detects whether a standard-sized sheet is being fed into the scanner in landscape orientation or an oversized sheet is being fed into the scanner in portrait orientation.

Further, U.S. Pat. No. 6,574,375 to John F. Cullen et al., filed Mar. 12, 1996, discloses a method and apparatus for detecting proper page orientation of a scanned document image. U.S. Pat. No. 5,912,448 to Richard G. Sever et al., filed May 16, 1997, discloses a method and apparatus for determining an extent of skew present in a document being scanned using a primary vision transducer. The primary vision transducer is wider than the width of the media to be scanned, and is logically divided into a central image gathering portion and a marginal skew detection and image gathering portion.

U.S. Pat. Nos. 5,594,817 and 5,729,635 to Bruce B. Fast et al., filed May 22, 1995 and Oct. 17, 1996, respectively, disclose methods for identifying, correcting, modifying and reporting imperfections and features in pixel images that prevent or hinder proper optical character recognition (OCR) and other document imaging processes. While U.S. Pat. Nos. 5,594,815 and 5,590,224 also to Bruce B. Fast et al., both filed May 22, 1995, disclose processes for enhancing images of scanned documents that identify a variety of items in the scanned document which make optical character recognition and other document image processing difficult or impossible.

SUMMARY

In related art imaging systems, a scanner may completely scan a document at least once to determine a document size prior to scanning the document for electronic image conversion. The scanner may be a line scanner attached to a constant velocity transport (CVT) device, which moves the line scanner in a slow scan direction. A slow scan direction is the direction in which the CVT device traverses the line scanner across the platen in order to scan a document. Because it takes time for the CVT device to traverse the line scanner across the platen, the document size identification process is rather a slow time consuming process that is compounded when multiple documents are being scanned.

Thus, a document size identification module according to an embodiment receives a single scan line of a document and detects for at least one of a first transition and a second transition in the single scan line. The document size identification module then calculates a value based on at least one of the first and second transitions, and determines the document size based on the value. In another embodiment, a scan line generator repeatedly generates the scan line a predetermined number of times. A skew module receives the scan line generated by the scan line generator and generates at least two corner coordinate values. The document size identification module then determines at least one of the first and second transitions from the two corner coordinate values.

These and other features and advantages are described in, or are apparent from, the following detailed description of various exemplary embodiments of the methods and apparatus.

BRIEF DESCRIPTION OF THE DRAWINGS

Various exemplary embodiments will be described in detail with references to the following figures, wherein.

DETAILED DESCRIPTION

Figure 1:
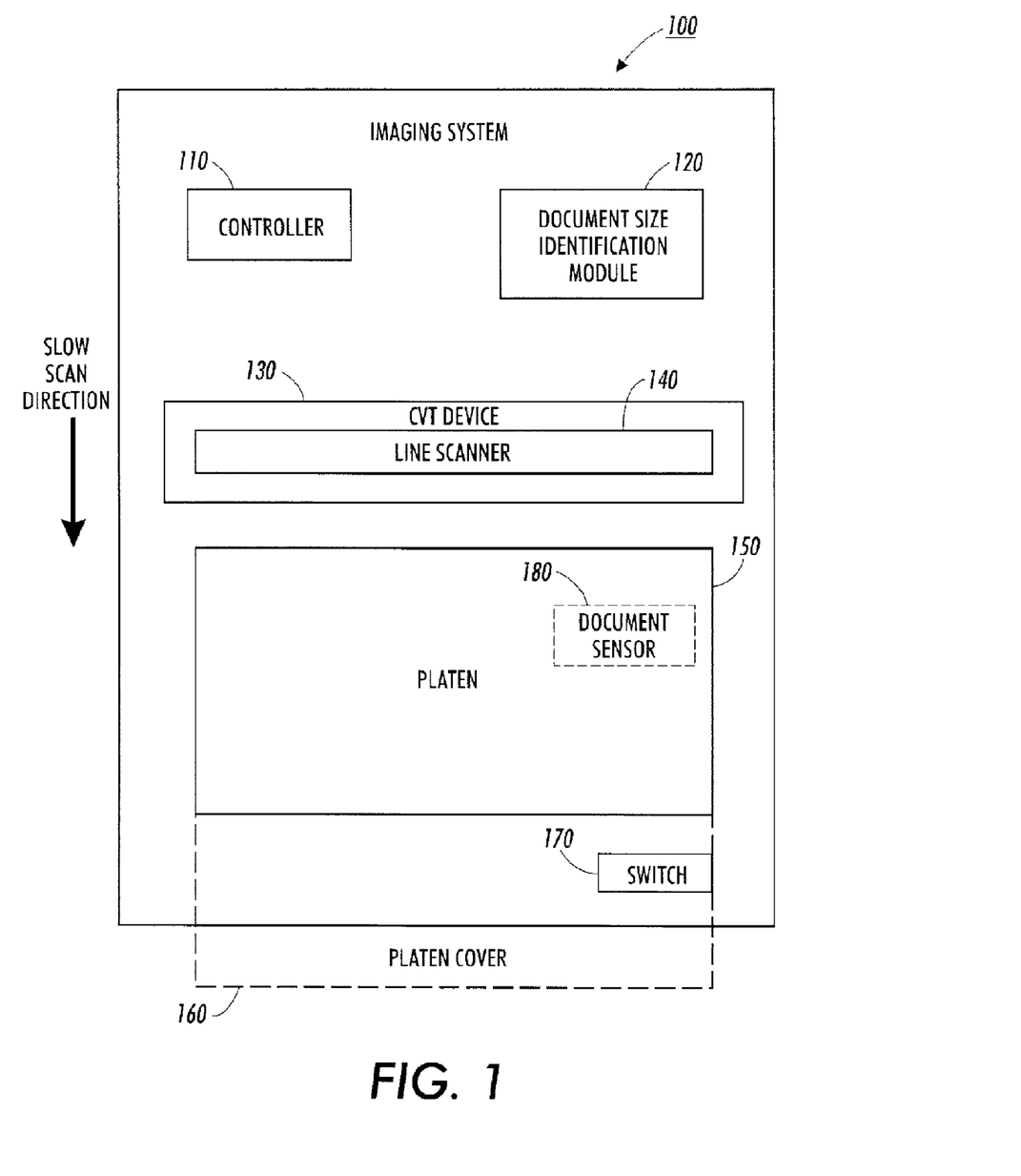
FIG. 1 illustrates a functional diagram of an imaging system.

FIG. 1 illustrates an exemplary imaging system 100 that includes a controller 110, a document size identification module 120, a constant velocity transport (CVT) device 130, a line scanner 140 and a platen 150. The imaging system 100 may be a scanning system, a scanning printing system, a xerographic marking device, a digital photocopier, a facsimile machine, a multifunction device, and the like. The platen 150 usually has a scan area that is larger than a largest specified document size to be placed on the platen 150 so that an overscanning of a document may be performed. The platen 150 may include a top registration guide 210 and a left registration guide 220 (see FIG. 2) which may be used as references by the user when positioning the document on the platen 150. The imaging system 100 may further include a platen cover 160, a switch 170 to activate the document size identification module 120, and multiple paper trays (not shown), each tray holding a predetermined paper size.

The controller 110 controls the overall operation of the imaging system 100. The line scanner 140 is attached to the CVT device 130, which under the control of the controller 110, traverses the line scanner 140 across a length or width of the platen 150 or a document placed on the platen 150. The line scanner 140 scans the platen 150 area scan line by scan line as it traverses across the platen 150. A document in the optical path of the line scanner 140 is scanned to be converted into an electronic image. The controller 110 may then store the electronic image in a memory which is subsequently used to duplicate the document. Prior to scanning the document, however, the controller 110 first may have to identify document size so that a correctly sized paper sheet on which the document may be duplicated is retrieved from one of the multiple paper trays.

In accordance with an embodiment, the document size identification module 120 may be activated when a document is placed on the platen 150 and the switch 170 is triggered. The switch 170 may be triggered manually or, in an alternative embodiment, the switch 170 may be triggered by an operation of the platen cover 160. For instance, from an open position, when the platen cover 160 is lowered by a predetermined angle, the platen cover 160 triggers the switch 170 which, in turn, activates the document size identification module 120. The document size identification module 120 identifies the document size by the time the platen cover 160 is closed. In another alternative embodiment, the imaging system 100 may employ a document sensor 180 that senses a document placed on the platen 150 and activates the document size identification module 120.

Figure 2:
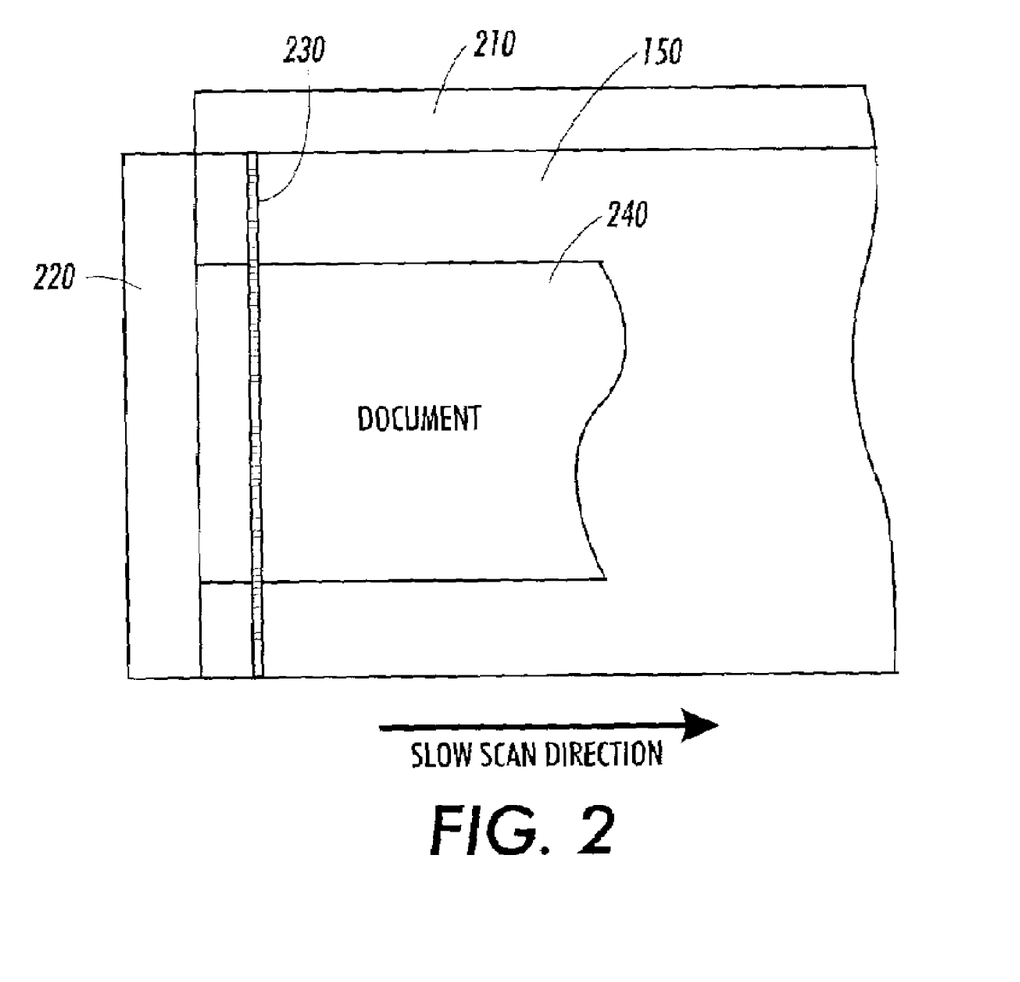
FIG. 2 illustrates a line scanner capturing a single scan line of a document.

Referring now to FIG. 2, the document size identification module 120 itself, or via the controller 110, causes the line scanner 140 to scan a single line 230 in a fast scan direction (i.e., a direction perpendicular to the slow scan direction) and to forward the result of the scan line 230 to the document size identification module 120. In this embodiment a single scan line in the fast scan direction is used to determine a document size. However, it should be appreciated that sensor(s) in the slow scan direction combined with sensor(s) in the fast scan direction may be used to determine a document size. In the embodiment, the scan line 230 is forwarded as a serial image data stream streaming at a predetermined clock rate. The document size identification module 120 receives and analyzes the scan line 230 in order to identify the document size.

Figure 3:
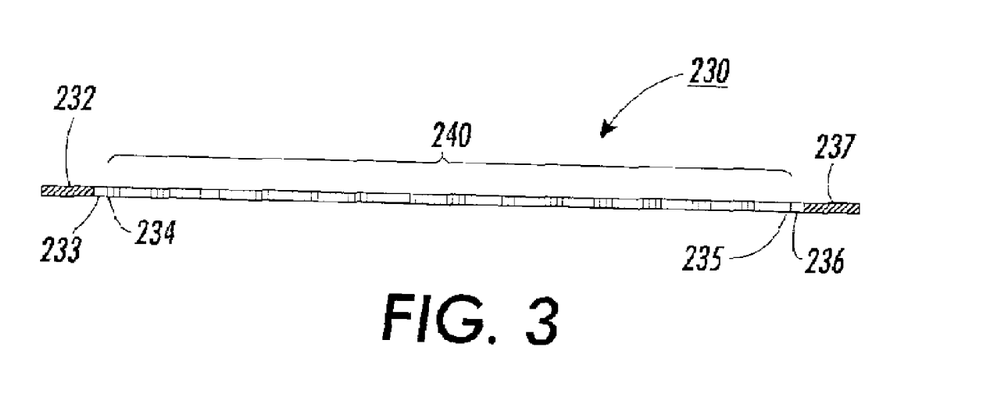
FIG. 3 illustrates a more detailed view of the captured scan line.

FIG. 3 illustrates as an example a more detailed view of the scan line 230 captured by the line scanner 140. For sake of simplifying the understanding of the various embodiments, a dark portion of the scan line will be referred to as a "black" portion and a light portion of the scan line will be referred to as a "white" portion. However, it should be appreciated that the document size identification module 120 may receive the scan line 230 as a combination of voltage "low" and voltage "high", where voltage low may represent black and voltage high may represent white. A first transition 233 from a black portion 232 to a white portion 234 of the scan line 230 represents an edge transition from the overscan area of the platen 150 to the document 240. Plural black portions on the document 240 portion of the scan line 230 may be parts of letters, numbers or images on the document 240. A second transition 236 from a white portion 235 to a black portion 237 represents an edge transition from the document 240 to the overscan area of the platen 150. By detecting the first transition position 233 and the second transition position 236, the document size identification module 120 is able to identify the document size 240, which will be apparent below. However, there are instances where one of the edge transition positions 233 and 236 may be not detected by the document size identification module 120. For example, an edge of the document 240 may be placed against the top registration guide 210. As will become apparent below, the document size identification module deduces the edge transition position 233 or 236 when one of the edge transition positions 233 and 236 is not detected.

Figure 4:
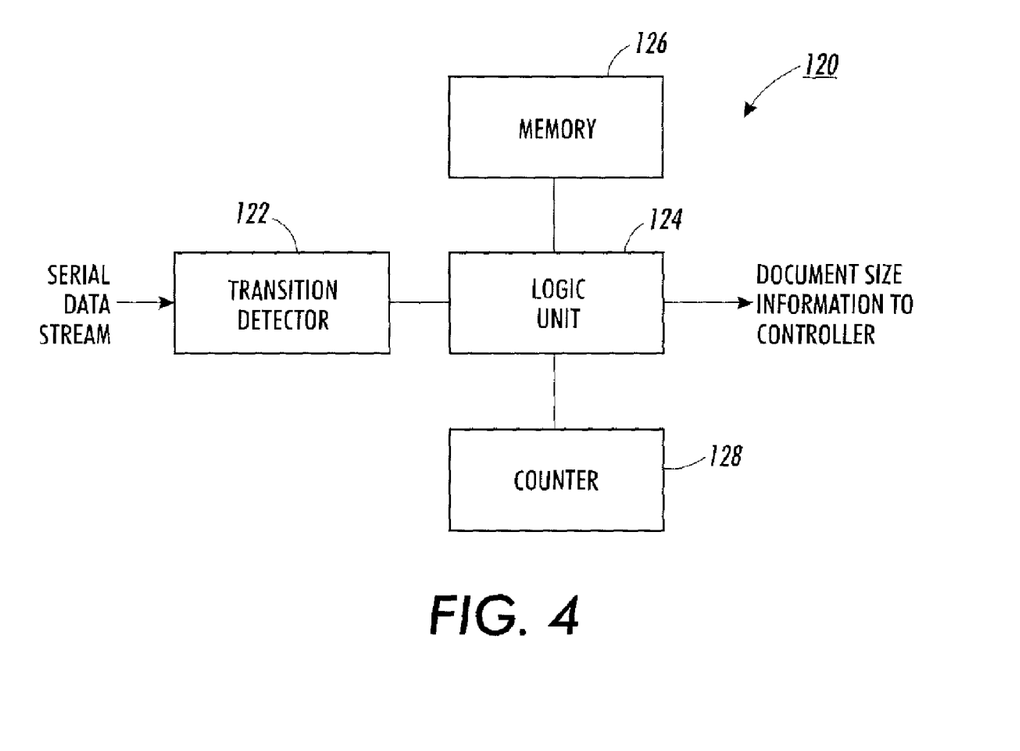
FIG. 4 illustrates an exemplary document size identification module that identifies a size of a document using the captured scan line of FIG. 3.

Referring now to FIG. 4, the document size identification module 120 can include a transition detector 122, a logic unit 124, a memory, such as a content addressable memory (CAM) 126, and a counter 128. One function of the document size identification module 120 is not to falsely identify one or more black portions (i.e., parts of letters, numbers or images on the document 240) as an edge transition from the document 240 to the overscan area of the platen 150 or vice versa. Accordingly, the document size identification module 120 stores parameters in the CAM memory 126, which may be programmable parameters, that aids in preventing the module from falsely detecting the black portions on the document 240 as an edge transition.

For example, most, if not all, paper sizes are standardized. For sake of simplifying the understanding of the various embodiments, two popular paper sizes; the eight and one-half inch by eleven inch sheet (standard letter size) and the A4 sheet will be discussed below. However, it is understood that the document size identification module 120 is capable of identifying other paper sizes.

When the document size identification module 120 receives the serial image data stream of the scan line 230, the transition detector 122 detects for an edge transition from the document 240 to the overscan area of the platen 150 or vice versa. The transition detector 122 may detect edge transitions in real time or alternatively, may store the serial image data stream in a register and detect for edge transitions at a later time. If the transition detector 122 detects the first data bit of the scan line 230 as being black, this usually signifies that a data bit corresponding to an overscan area of the platen 150 has been captured. Conversely, if the first data bit of the scan line 230 is white, this usually signifies that a data bit corresponding a document portion 240 has been captured. Usually, the data bit at both ends of the scan line 230 will be black or one end will be black and the other end will be white. But both ends of the scan line usually will not be white because of the overscanning properties of the platen 150 area. Thus, referring back to FIG. 2, both ends of the scan line 230 should start with black if the document 240 has not been placed against the top registration guide 210. However, if one end of the document 240 has been placed against the top registration guide 210, then only one end of the scan line may be black.

The transition detector 122 that detects black as the first data bit of the scan line 230 continues to receive the incoming serial image data stream of the scan line 230 until a transition into a white data bit is detected. This signifies that an edge transition from the overscan area of the platen 150 to an edge of the document 240 has been detected. The transition detector 122 may signal the logic unit 124 that a transition from black to white has been detected. The logic unit 124 initializes the counter 128 and for any subsequent data bit received by the transition detector 122, the counter 128 is incremented.

The transition detector 122 continues to receive the incoming serial image data stream to detect for the next edge transition, which in this instance, is a transition from white to black. When the transition detector 122 detects a transition from white to black, the transition detector 122 may signal the logic unit 124 that a transition from white to black has been detected. The logic unit 124 then may use the value of the counter 128 as an index to the CAM memory 126.

A match with one of the values stored in the CAM memory 126 indicates that a document size has been identified. In particular, the value of the counter 128 represents a document width. Thus, a match with a value in the CAM memory 126 that represents a width of a standard letter size indicates that the document size is a standard letter size. Conversely, a match with a value that represents a width of an A4 sheet indicates that the document size is an A4 sheet. When a match occurs, the document identification module 120 signals the controller 110 with the document size.

Otherwise, if the value of the counter 128 does not match with any of the stored values, the logic unit 124 may disregard the detected transition and the transition detector 122 continues to detect for the next white to black transition. However, the counter 128 continues to be incremented for every data bit that the transition detector 122 receives. According to one embodiment, if the transition detector 122 detects the last white to black transition in the serial image data stream and a match with an expected document width does not occur, then the logic unit 124 uses the first detected edge transition and the last detected white to black transition to determine a document size regardless of whether a match had not occurred. For example, approximation techniques may be used to determine which one of the standard document widths closely matches a value corresponding to the first detected edge transition and the last detected white to black transition. According to another embodiment, if no final white to black transition is detected towards the end of the serial image data stream, then the logic unit 124 determines that the document width corresponds to a maximum document width and forwards the document size information corresponding to the maximum document width to the controller 110.

In the case where an edge of the document 240 is placed against the top registration guide 210, the transition detector 122 may not detect a black to white transition because there is no overscan area of the platen 150 between the document 240 and the top registration guide 210. In this instance, when the transition detector 122 detects, for example, a final white to black transition, this information is forwarded to the logic unit 124. The logic unit 124 then determines that the lead edge (i.e., first black to white transition) is the known location of the top registration guide 210. In this embodiment, another counter can be used to keep track of the position of the final white to black transition in the serial image data stream. The logic unit 124 determines a document width based on the known location of the top registration guide 210 and the final white to black transition and forwards the document size information corresponding to the determined document width to the controller 110.

For the document size identification module 120 to receive a scan line 230 that represents a line on the document 240, the line scanner 140 should be at a position where a line of the document 240 will be captured regardless of where the document 240 is placed on the platen 150. It should be appreciated that the scan area of the platen 150 is usually larger than the size of the document 240. Thus, the document 240 could be placed on any part of the platen 150 area. Therefore, the line scanner 140 should scan a single line in which the line scanner 140 may reliably capture a single scan line of the document 240 that is placed anywhere within the area of the platen 150. For instance, if a line scan can be reliably performed for all the paper sizes of documents at a midway point of the platen 150, then the document size identification module 120 may be configured such that the document size identification module 120 itself or via the controller causes the CVT device 130 to move the line scanner 140 to the midway point of the platen 150. At this point the line scanner 140 may consistently capture a scan line of a document placed on the platen 150. However, in moving the line scanner 140 to the midway point of the platen 150, there may be an associated time delay.

As shown in FIG. 2, one solution to reliably capture a line scan of the document is to have the document placed on the platen against the left registration guide. The document need not necessarily be placed against the top registration guide. In this manner, the line scanner only needs to travel a short distance in the slow scan direction, if at all, to reliably scan a line of the document placed on the platen 150.

Figure 5:
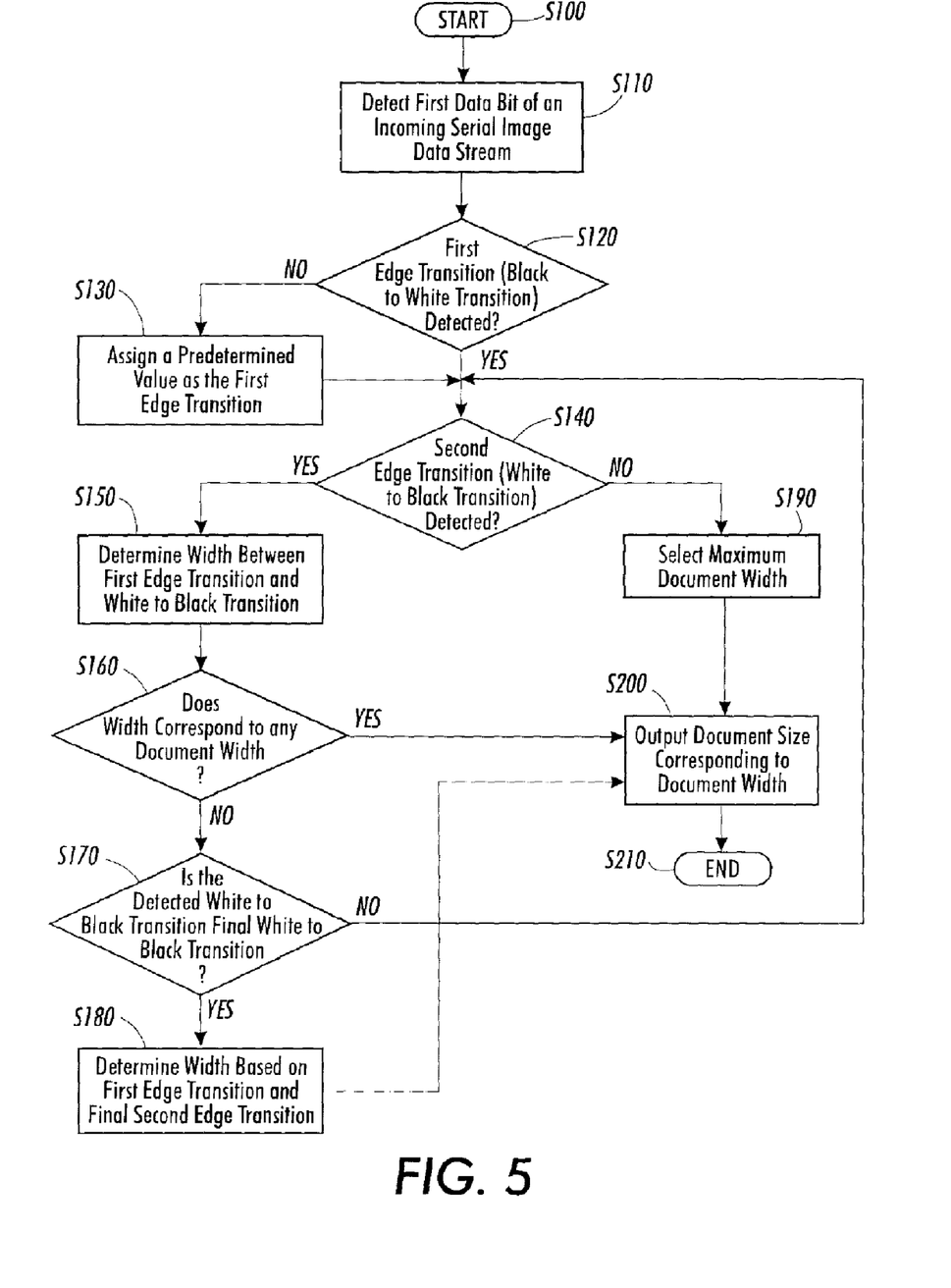
FIG. 5 illustrates an exemplary flowchart for identifying a document size.

FIG. 5 illustrates an exemplary method for identifying a paper size of a document. The method starts at step S100 and continues to step S110 where an incoming serial image data stream is analyzed. A first data bit of the serial image data stream is detected. The first data bit may be either black or white. At step S120, successive data bits are detected for a first edge transition (i.e., a first transition from black to white). A determination is made whether a first edge transition is detected. If the first edge transition is detected, operation continues to step S140. Otherwise, if the first edge transition is not detected, the operation continues to step S130. At step S130, the first edge transition is assigned a predetermined value. This value may be the position of the first data bit, which may correspond to a position of the top registration guide. The operation then continues to step S140.

At step S140, a transition from white to black along successive data bits of the serial image data stream is detected, which may be a second edge transition. A determination is made whether a transition from white to black has been detected. If the transition from white to black has been detected, then at step S150, a width between the position of first edge transition and a position of the data bit in which the white to black transition has occurred is determined. At step S160, a determination is made whether the determined width matches any of the standard document widths. If the determined width does not match any of the standard document widths, then the operation continues to step S170. At step S170, a determination is made whether the detected white to black transition is a final white to black transition in the serial data stream. If the detected white to black transition is the final white to black transition, then the operation continues to step S180. At step S180, a document width based on the first edge transition and the final white to black transition is determined. For example, approximation techniques may be used. The operation continues to step S200 where a document size corresponding to the document width is determined. The operation then continues to step S210 where the operation ends. Otherwise, at step S170, if the detected white to black transition is not the final white to black transition, then the operation continues to step S140 to repeat the process.

Otherwise, at step S140, if the transition from white to black has not been detected, then the operation continues to step S190. At step S190, a maximum document width is selected. The operation then continues to step S200 to identify the document size. Then, at step S210, the operation ends.

According to another embodiment, an existing skew detection module in an imaging system may be used to identify a document size. Examples of a skew detection module may be found in U.S. Pat. No. 5,528,387 to Nancy R. Kelly et al., filed Jun. 18, 1996; and U.S. Patent Publication Nos. 2001/0022674 and 2001/0022675, to Nancy R. Kelly et al., both filed Sep. 20, 2001, the three references which are incorporated herein by reference in their entirety.

Figure 6:
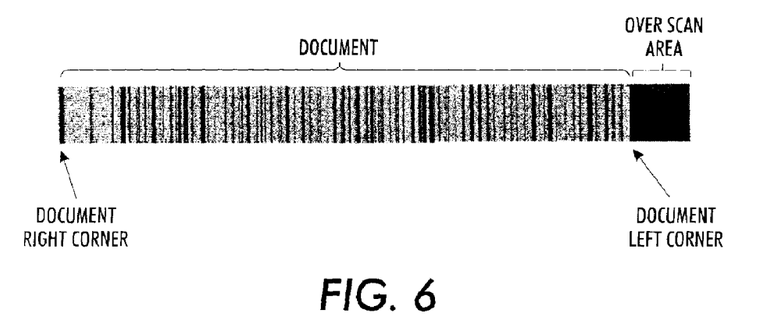
FIG. 6 illustrates an exemplary single scan line that is repeated to form a "mini-page"

An operation to identify a document size using an existing skew module may be as follows: Prior to scanning the document to detect a skew and correction thereof, a single scan line of the document is captured as shown in FIG. 2. In accordance with an embodiment, the captured scan line is then repeatedly sent to the skew module a predetermined number of times. The repetition of the single scan line forms a "mini-page." FIG. 6 shows an exemplary mini-page. In this example, the document 240 is placed against the top registration guide, and thus there is no black portion on the left end of the mini-page representing an overscan area of the platen. Conversely, at the right end of the mini-page, there is an overscan area of the platen. The mini-page is recognized as a "document" by a skew module.

As an example, the skew module may analyze the mini-page (i.e., document) to determine the four corners C0, C1, C2 and C3 of the document and skew. A full width array (FWA) produces a scanline signal which indicates the beginning of each new scanline and a pixel clock signal which indicates the appearance of the new set of image data corresponding to a single pixel. Within the skew module, an edge detecting module produces a signal indicating a presence of edge data in the image data stream representing the document. A signal indicating the presence of edge data is forwarded to corner detecting module. The corner detecting module first detects for an initial presence of the first corner C0. Then, the corner detecting module detects for a center of the document. The next corner C1 is detected once the corner C0 and center of the document has been detected. Using the coordinate values of the corners C0 and C1 and the center of the document, the skew module determines the skew angle of the document. The skew module may then detect the remaining corners C3 and C4. Further details may be found in U.S. Pat. No. 5,528,387 and U.S. Patent Application Nos. 2001/0022674 and 2001/0022675.

Figure 7:
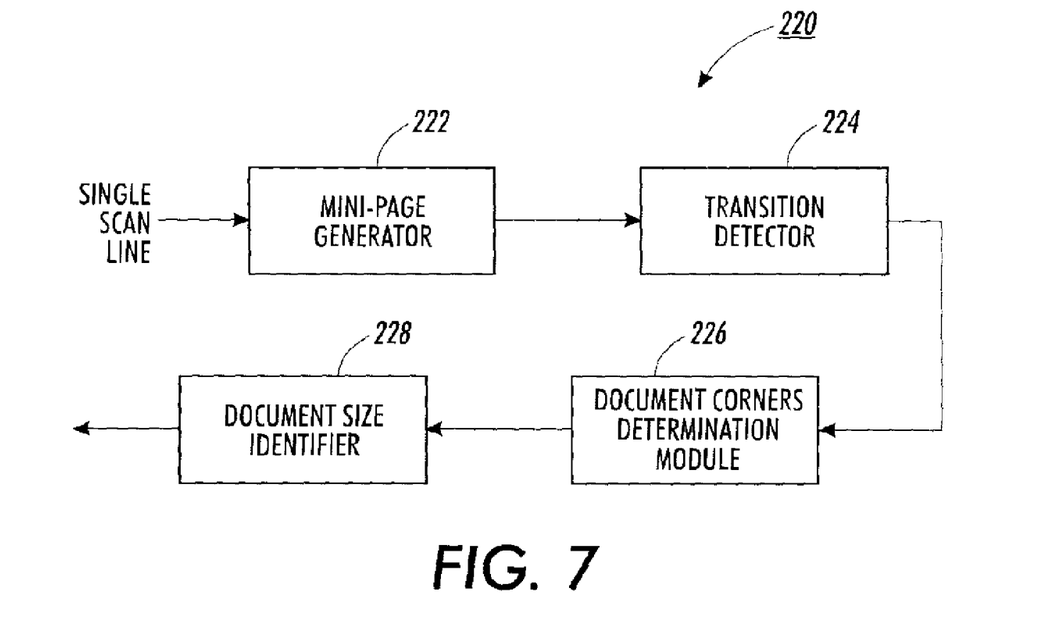
FIG. 7 illustrates another exemplary document size identification module.

FIG. 7 illustrates an exemplary document size identification module 220 that includes a mini-page generator 222, a transition detector 224, a document corners determination module 226 and a document size identifier 228. The mini-page generator 222 receives a single scan line and duplicates the scan line until a mini-page is formed as shown in FIG. 6. The document size identifier 228 receives information regarding a start edge FSStart (black to white transition) and an end edge FSEND (white to black transition), which is used to determine a width of a document captured in the mini-page. The two edges can be detected in each scan line.

According to one exemplary embodiment, the transition detector 224 and the document corner determination module 226 can correspond to the skew module illustrated in FIG. 7 of U.S. Patent Application Nos. 2001/0022674 and 2001/0022675. Specifically, the transition detector 224 and the document corner determination module 226 corresponds to the hardware detecting edge of the document 1000 and a software analyzing the edges to determine the corners of the document 1002.

The hardware detecting edge of the document 1000 detects for edges, either black to white or white to black transitions. An example of the hardware detecting edge of the document 100 may be found in U.S. Pat. No. 5,528,387. The software analyzes the edges to determine the corners of the document 1002 then analyzes the edge information to accurately determine at least two corners of the document. For instance, two top corners of a document may be used to analyze the edge information. A maximum of two edges can be detected for each scanline, that is, a FSStart (for black to white transition) and a FSEnd (for white to black transition).

Figure 8:
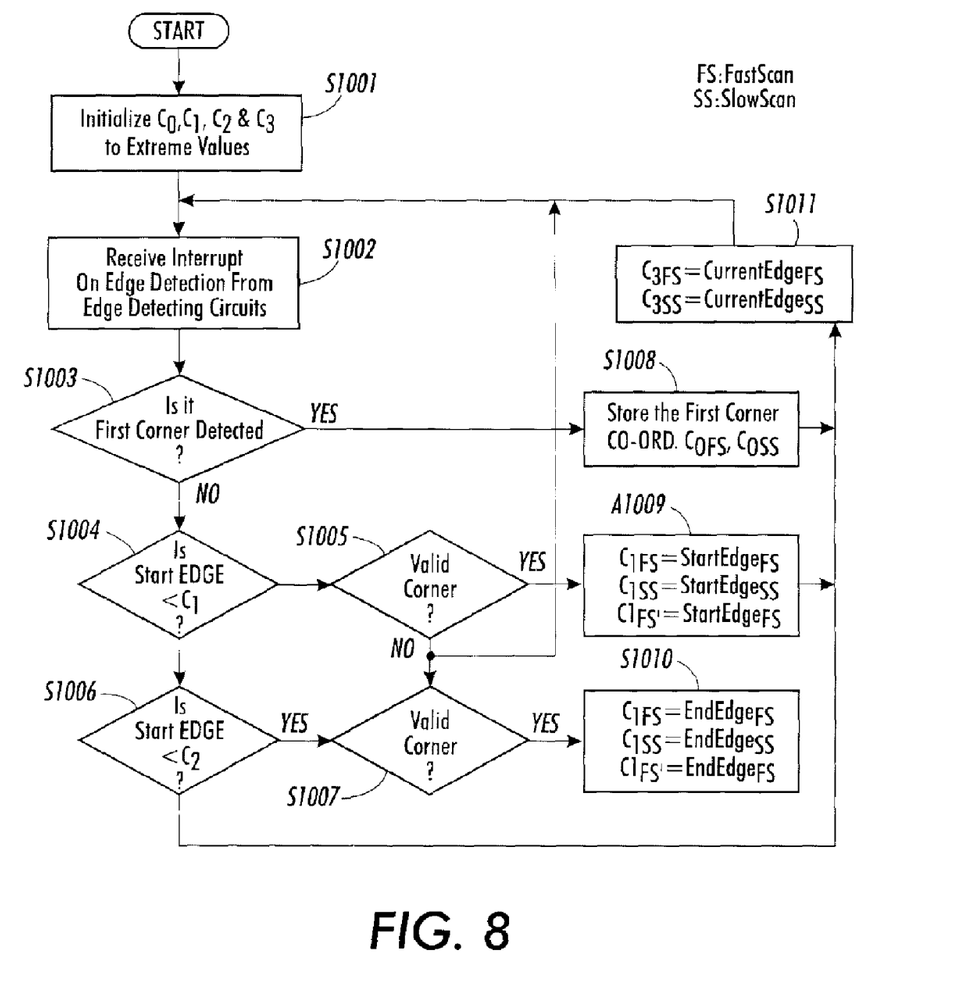
FIG. 8 illustrates a flowchart showing an exemplary process for identifying corners of a document.

FIG. 8 illustrates an exemplary flowchart for detecting the four corners of the document from the edge information. As shown in FIG. 8, the corner values are initialized at step S1001. Thereafter, at step S1002, the edges of the document are detected and at step S1003 it is determined if the first corner has been detected. If yes, the first corner coordinates are stored at step S1008. If it is not determined that the first corner was detected, then it is determined if the start or leading edge is less than a first threshold at step S1004.

If it is determined that the start edge is less than a first threshold, then it is determined if the edge is a valid corner at step S1005. If it is not a valid corner, the process returns to detecting edges. On the other hand, if it is a valid corner, step S1009 stores the coordinates of the start edges.

If it is determined that the start edge is greater than a first threshold at step S1004, then step S1006 determines if the end or trailing edge is greater than a second threshold. If it is determined that the end edge is greater than a second threshold, then it is determined if the edge is a valid corner at step S1007. If it is not a valid corner, the process returns to detecting edges. On the other hand, if it is a valid corner, step S1010 stores the coordinates of the end edges.

From the above method, the following information can be obtained:

The first corner C0 is detected (COFS, COSS).

The second corner C1 is detected, which is the minimum FSStart location (C1FS, C1SS) and the corresponding FSEnd (C1FS).

The third corner C3 is detected, which is the maximum FSEnd location (C2FS, C2SS) and the corresponding FSStart (CSFS).

The fourth corner C4 is detected (C3FS, C3SS).

It should be appreciated that the mini-page has been generated from a single scan line. The single scan line has been generated from a document that has been placed against the left registration guide, as shown in FIG. 2. Thus, each scan line analyzed by the method of FIG. 8 will generate the same FSStart and FSEnd. Thus, the document size identifier receiving the FSStart and FSEnd is able to determine a width of a document. By determining the width of the document, the document size is identified.

In various exemplary embodiments outlined above, the document size identification module may be implemented using a programmed microprocessor, a microcontroller, peripheral integrated circuit elements, an application specific integrated circuit (ASIC) or other integrated circuit, a hard-wired electronic or logic circuit such as a discrete element circuit, a programmable logic devices such as PLD, PLA, FPGA or PAL, or the like. In general, any device capable of implementing a finite state machine that is in turn capable of implementing the flowcharts shown in FIGS. 5 and 8 may be used to implement the document size identification module. Moreover, various selective portions of the document size identification module may be implemented as software routines.

While various exemplary embodiments have been described, it is evident that many alternatives, modifications and variations will be apparent to those skilled in the art. Accordingly, the exemplary embodiments, as set forth above, are intended to be illustrative, and not limiting. Various changes may be made.

What is claimed is:

1. A method for identifying a document size, the method comprising:
    scanning a document to generate a scan line;
    detecting at least one of a first transition and a second transition in the scan line;
    repeatedly generating the scan line a predetermined number of times;
    detecting a skew angle from the repeated scan line when the scan line is generated;
    calculating a value based on the at least one of the first and second transitions and the skew angle; and
    determining the document size based on the value.

2. The method of claim 1, wherein determining the document size further comprises:
    determining whether the calculated value corresponds to a width of a predetermined paper size; and
    selecting the paper size as the document size if the calculated value corresponds to the width of the paper size.

3. The method of claim 2, further comprising:
    discarding the calculated value if the calculated value does not correspond to a width of any predetermined paper sizes.

4. The method of claim 1, further comprising:
receiving at least two corner coordinate values from the scan lines to detect the skew angle; and
determining at least one of the first and second transitions based on the at least two corner coordinate values.

5. A computer readable medium or a modulated signal being encoded to perform the method of claim 1.

6. A computer readable medium or modulated signal being encoded to perform the method of claim 4.

7. An apparatus to identify a document size, comprising:
a transition detector that detects at least one of a first transition and a second transition in a single scan line scanned from a document;
a scan line generator that repeatedly generates the scan line a predetermined number of times;
a skew module that detects the skew angle from the scan line lines generated by the scan line generator; and
a logic unit that determines a document size based on at least one of the first and second transitions of the scan lines and the skew angle.

8. The apparatus of claim 7, further comprising:
a memory that stores at least one value corresponding to a width of a paper size; and
the logic unit calculating a value based on at least one of the first and second transitions, and the logic unit determining whether the calculated value corresponds to a value stored in the memory.

9. The apparatus of claim 8, wherein the logic unit discards the calculated value if the calculated value does not correspond to the value stored in the memory.

10. The apparatus of claim 7, further comprising a document size identifier that receives at least two corner coordinate values from the skew module and generates at least one of the first and second transitions.

11. A marking device incorporating the apparatus of claim 7.

12. A digital photocopier incorporating the apparatus of claim 7.

13. A scanner or a multifunctional device incorporating the apparatus of claim 7.

14. An apparatus to identify a document size, comprising:
means for scanning a document to generate a scan line;
means for detecting at least one of a first transition and a second transition in the scan line;
means for repeatedly generating the scan line a predetermined number of times;
means for detecting a skew angle from the repeated scan line when the scan line is generated;
means for calculating a value based on at least one of the first and second transitions and the skew angle; and
means for determining the document size based on the value.

15. The apparatus of claim 14, further comprising:
means for determining whether the calculated value corresponds to a width of a paper size; and
means for selecting the paper size as the document size if the calculated value corresponds to the width of the paper size.

16. The apparatus of claim 14, further comprising means for receiving at least two corner coordinate values from the scan lines to determine the skew angle and for determining the first and second transitions based on the at least two corner coordinate values.

* * * * *